United States Patent [19]

Willis

[11] Patent Number: 4,594,726

[45] Date of Patent: Jun. 10, 1986

[54] DEDITHERING CIRCUITRY IN DIGITAL TV RECEIVER

[75] Inventor: Donald H. Willis, Indianapolis, Ind.

[73] Assignee: RCA Corporation, Princeton, N.J.

[21] Appl. No.: 676,142

[22] Filed: Nov. 29, 1984

[51] Int. Cl.$^4$ .......................... H04N 9/32; H04N 9/50
[52] U.S. Cl. ........................................ 375/26; 358/13; 358/23; 358/36; 375/34
[58] Field of Search ...................... 358/13, 23, 36, 141; 375/25, 26, 34; 328/74, 162, 166; 381/31, 94; 340/347 DD, 347 CC; 360/32

[56] References Cited

U.S. PATENT DOCUMENTS

| | | | |
|---|---|---|---|
| 3,999,129 | 12/1976 | Kasson | 375/34 |
| 4,334,237 | 6/1982 | Reitmeirer et al. | 358/36 |
| 4,352,123 | 9/1982 | Flamm | 358/23 |
| 4,460,924 | 7/1984 | Lippel | 358/13 |
| 4,524,447 | 6/1985 | Willis et al. | 375/26 |

Primary Examiner—Benedict V. Safourek
Attorney, Agent, or Firm—E. M. Whitacre; P. J. Rasmussen; D. A. Kulkarni

[57] ABSTRACT

A 7 bit digital signal is dithered by adding a low-level digital dithering signal comprised of alternating 1's and 0's, and by truncating the product to 6 bits. To dedither, an EXCLUSIVE-OR gate compares the previous and the current values of the least significant bit of the 6 bit dithered signal. If they are dissimilar, it outputs a "1". Otherwise, it outputs a "0". The output of the EXCLUSIVE-OR gate is ANDed with the dithering signal. If the dithering signal and the output of the EXCLUSIVE-OR gate are both one, then the 6 bit dithered signal is decremented. Otherwise, the 6 bit dithered signal is passed unchanged. The decremented-or-not 6 bit dithered signal is combined with the bit generated by the EXCLUSIVE-OR gate to produce the final 7 bit reconstituted signal.

14 Claims, 5 Drawing Figures

DEDITHERING CIRCUITRY IN DIGITAL TV RECEIVER

The present invention generally relates to a digital television receiver in which the digital signal level is modified in accordance with a low-level digital dithering signal. More particularly, the subject invention pertains to circuitry for undithering the dithered digital television signals.

There are two types of dithering/dedithering arrangements having applications to digital circuitry. In one type, it is known to introduce a predetermined analog disturbance into the analog signal so as to increase the apparent quantizing resolution of an analog-to-digital converter (ADC) beyond that inherent in the number of possible levels of the digital signal it develops. U.S. Pat. Nos. 4,352,123 and 4,334,237 describe examples of such analog dithering/dedithering systems.

There is another type of dithering/dedithering application in which the digital signal is dithered in accordance with a low-level digital dithering signal comprised of alternating 1's and 0's to save the bits in the transmission path and signal processing hardware. U.S. patent application, Ser. No. 498,151, now U.S. Pat No. 4,524,447 filed in behalf of Willis et al., and entitled "DIGITAL SIGNAL PROCESSING APPARATUS HAVING DIGITAL DITHER", describes an example of this type of digital dithering/dedithering circuitry.

In the Willis, et al. digital dithering arrangement, an n-1 bit dithered digital signal is produced by adding to the n bit undithered digital signal a dithering signal of alternating 1's and 0's at one-half the rate at which the undithered input samples are received, and then simply truncating it to n-1 bits by taking the n-1 most significant bits (MSB's) of the output signal. The Willis, et al. system generates n-1 bit output numbers for even n bit input numbers which are the same as the n-1 MSB's of the input numbers. In response to n bit steady-state odd input numbers, on the other hand, the dither circuit produces n-1 bit output numbers that alternate between a lower value that corresponds to the n-1 MSB's of the input numbers, and a higher value that corresponds to the n-1 MSB's of the input numbers with a one added to the least significant bit (LSB) position thereof.

To reconstruct the n bit input signal, Fuhrer, et al. additively combine the current value of the n-1 bit dithered samples with the previous value thereof. While the Willis, et al. averaging-type dedither circuit reconstructs without error the even and odd steady-state samples, it suffers from degraded impulse response and reduced bandwidth. For example, a step function requires a minimum of two successive samples to attain the steady-state value. The Willis, et al. dedither circuit is in effect a transversal notch filter with the notch located at $F_D/2$, where $F_D$ is the input signal sampling frequency. A suitable value for the input signal sampling frequency has been found to be equal to four times the color subcarrier frequency ($F_{SC}$) - i.e., $4 \times 3.58$ MHz or 14.32 MHz.

In accordance with the present invention, the dedithering circuit includes means for generating a first set of 1 bit signal samples by exclusive-or-ing the delayed and undelayed LSB's of the n-1 bit dithered signal. The dedithering circuit further includes combining means (a) which subtracts a one from the n-1 bit dithered signal if the instantaneous values of both the dithering signal and the 1 bit signal are one, and (b) which passes the n-1 bit dithered signal unaffected otherwise to, in turn, generate the n-1 MSB's of an n bit reconstituted signal. The n-1 MSB's at the output of the combining means are merged with the first set of 1 bit signal samples to form the n bit reconstituted signal.

In the Drawings, line arrows represent signal paths for analog signals or for single bit digital signals, and line arrows having slash marks represent signal paths for multiple-bit parallel digital signals, with the number of bits thereof indicated by a numeral or legend proximate to the slash mark.

Figure 1:
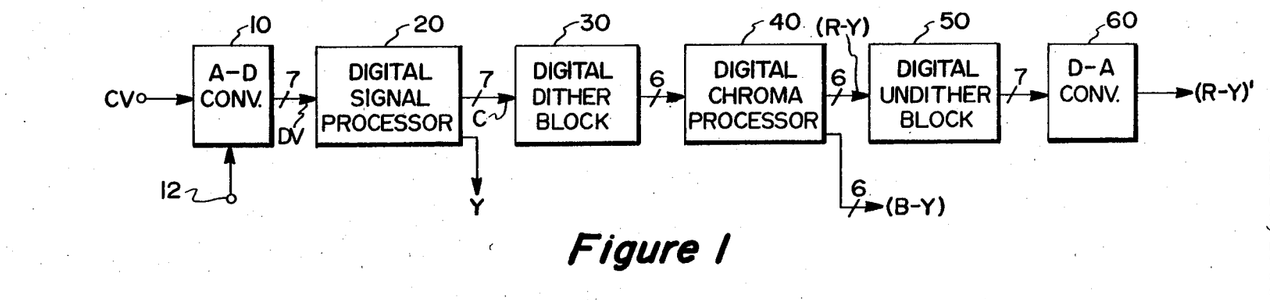
FIG. 1 is a schematic block diagram of a digital signal processing arrangement as is employed in a color television receiver.

FIG. 1 shows a digital signal processing arrangement as is employed in a color television receiver, and in which the present invention provides advantage. The analog composite video signal CV is applied to a seven-bit analog-to-digital converter (ADC) 10, which develops seven-bit digital samples having levels representing the instantaneous magnitudes of the input signal CV. For descriptive purposes, the original undithered signal is assumed to have 7 bits, the dithered signal to have 6 bits, and the reconstructed output signal to again have 7 bits. The ADC 10 receives a clock signal $F_D$, preferably at four times the frequency $F_{SC}$ of the color subcarrier signal and in phase lock with the reference burst thereof, to produce digital video samples DV at a $4\,F_{SC}$ rate.

The ADC 10 also receives an analog signal from a dither source 12 at one-half the horizontal line rate $F_H$ to inject an analog dither having an amplitude approximately equivalent to one-half the value represented by the least significant bit (LSB) of the digital video samples DV. The analog dither source 12, while tending to increase the apparent quantizing resolution of the ADC 10, is not a part of the present invention. Present invention, depicted in FIGS. 4 and 5, goes to the digital dithering/dedithering systems. Reference may be made to the afore-mentioned U.S. Pat. Nos. (4,352,123 and 4,334,237) for further details on the analog dithering/dedithering schemes.

The seven-bit digital video signals DV are applied to a digital signal processor 20 which, for example, separates the digital luminance Y and digital chrominance C component signals. The signal processor 20 comprises, for example, a digital 1 H comb filter or digital bandpass and low-pass filters for separating digital luminance Y and chrominance C component signals, a chrominance bandpass filter, and an automatic chrominance control to standardize the magnitude of the chrominance subcarrier signals. This processing can produce many additional bits (e.g., 13-bit signals) but the output from the signal processor 20 is limited to seven-bits.

Figure 2:
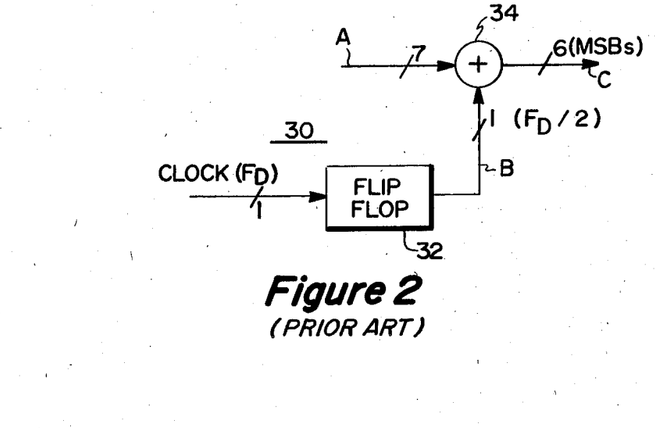
FIGS. 2 and 3 depict the dithering and dedithering arrangements of the prior art described in the aforementioned Willis et al. U.S. patent application.

Because a digital chrominance processor 40 is arranged to process, at least in part, only six-bit digital samples, a digital dither block 30 is interposed between the signal processor 20 and the chrominance processor 40. FIG. 2 shows an exemplary embodiment of the digital dither block 30 receiving seven-bit signal samples from the signal processor 20 and supplying six-bit selectively dithered digital signal samples to the chrominance processor 40. The clock signal rate $F_D$ (e.g., about 14.32 MHz) is frequency divided by a factor of two by a flip-flop 32 producing at one input terminal of a 7 bit summing circuit 34 an alternating signal of 1's and 0's at one-half the sampling clock rate. The undithered 7 bit input signal is applied to the other input terminal of the summing circuit 34. The output of the summing circuit 34 is truncated to one fewer bits (i.e., 6 bits) than the original undithered input signal.

The Fuhrer et al. dithering circuit 30 converts a steady-state 7 bit signal into a 6 bit signal which is alternating if the 7 bit signal is odd (i.e., has a one in the least significant bit position), and which is not alternating if the 7 bit signal is even (i.e., has a zero in the least significant bit position). Putting it differently, if the 6 bit dithered signal is constant, then it is representative of the 6 MSB's of a 7 bit original undithered signal with a zero in the least significant bit position. If the 6 bit dithered signal is alternating, it is representative of a 7 bit original signal that is odd, and that lies half-way between two 7 bit values formed by the alternating 6 bit signal taken as a 7 bit signal with a zero tacked on at the end to define the seventh and the least significant bit position.

The operation of the dither circuit 30 is illustrated by examples worked out in the following table. The column headings A, B and C represent the respective lines and buses in FIGS. 2 and 3.

TABLE 1

Figure 3:
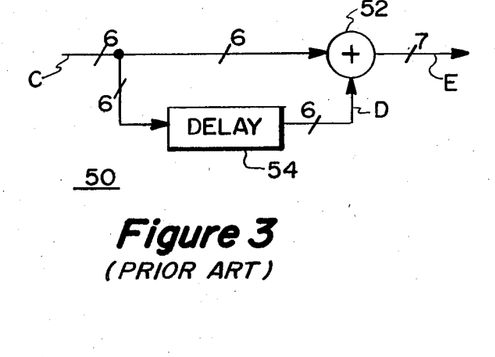

| SAMPLE NUMBER | INPUT (A) DECIMAL | 7 BIT BINARY | DITHER SIGNAL(B) | 6 BIT BINARY OUTPUT(C) |
|---|---|---|---|---|
| Odd Inputs: | | | | |
| 1 | 15 | 0001111 | 0 | 000111 |
| 2 | 15 | 0001111 | 1 | 001000 |
| 3 | 15 | 0001111 | 0 | 000111 |
| 4 | 15 | 0001111 | 1 | 001000 |
| Even Inputs: | | | | |
| 5 | 20 | 0010100 | 0 | 001010 |
| 6 | 20 | 0010100 | 1 | 001010 |
| 7 | 20 | 0010100 | 0 | 001010 |
| 8 | 20 | 0010100 | 1 | 001010 |

The six-bit dithered signals developed by the dithering block 30 are applied to and processed by a digital chrominance processor 40. The chrominance processor 40 performs operations such as adjusting saturation (color intensity) and hue (tint), demodulating the (R-Y) and (B-Y) chrominance component signals, and filtering the (R-Y) and (B-Y) signals. In addition, the chrominance processor 40 can include operations described above in relation to the signal processor 20 - e.g., bandpass filtering of the chrominance signals, and automatic chrominance controlling to standardize the magnitude of the chrominance subcarrier signals.

The six-bit (R-Y) chrominance digital samples developed by the chrominance processor 40 are applied to a digital undither block 50 which reforms seven-bit (R-Y) digital signals. An arrangement for the undither block 50, of the type disclosed in the aforesaid Willis et al. patent application, is the averaging circuit shown in FIG. 3. The six-bit incoming digital signal samples are applied to a six-bit digital adder 52 and to a delay device 54 which is a six-bit parallel latch or a six-bit parallel one-stage shift register. The adder 52 sums delayed incoming signal samples and undelayed incoming signal samples, both being six-bit signals, to develop a seven-bit reformed digital signal.

The operation of the dedither circuit 50 is illustrated in the following self-explanatory table. The column headings C, D and E refer to the appropriate lines and buses in FIGS. 2 and 3.

TABLE 2

| SAMPLE NUMBER | 6 BIT BINARY INPUT(C) | DELAYED 6 BIT INPUT(D) | OUTPUT (E) 7 BIT BINARY | DECIMAL |
|---|---|---|---|---|
| Odd Inputs: | | | | |
| 1 | 000111 | 001000 | 0001111 | 15 |
| 2 | 001000 | 000111 | 0001111 | 15 |
| 3 | 000111 | 001000 | 0001111 | 15 |
| 4 | 001000 | 000111 | 0001111 | 15 |
| Even Inputs: | | | | |
| 5 | 001010 | 001010 | 0010100 | 20 |
| 6 | 001010 | 001010 | 0010100 | 20 |
| 7 | 001010 | 001010 | 0010100 | 20 |
| 8 | 001010 | 001010 | 0010100 | 20 |

From a comparison of the output numbers in TABLE 2 with the input numbers in TABLE 1, it will be seen that the dithering/dedithering circuitry of the type described in Willis et al., and disclosed in FIGS. 2 and 3 of the subject application, reconstitutes the original input signals without error when the input signal is steady-state, The calculations above assume, for simplicity of explanation, that the values of the dithered signals prior to chrominance processing are the same as those of the processed dithered signals, which condition may not occur in practice.

The seven-bit reconstituted (R-Y) digital signal produced by the undither block 50 is converted back into an analog color signal (R-Y)' by a seven-bit digital-to-analog converter 60. The processed (B-Y) digital signal developed by the chrominance processor 40 is undithered by a second digital undither block (not shown) which is similar to the block 50, and thereupon converted back into an analog (B-Y) signal by a second DAC (not shown) which is similar to DAC 60.

As noted previously, the digital dedither scheme, shown in FIG. 3, sums each n-1 bit sample with the previous n-1 bit sample to form n bit reconstituted samples. This scheme replicates without error the even and odd steady-state input signal samples as can be seen from TABLES 1 and 2. The difficulty with this scheme, however, arises when the input signal is not steady-state - as, for example, when step variations or transients are present in the input signal. A step change requires two samples to attain the steady-state condition. The averaging-type dedither scheme of FIG. 3 introduces transient response time deficiencies as can be seen from the examples worked out below in TABLE 3. The degradation is particularly serious when a wideband signal is decoded.

TABLE 3

| SAMPLE NUMBER | INPUT (A) DECIMAL | INPUT (A) 7 BIT BINARY | DITHER-ING SIGNAL (B) | 6 BIT DITHERED BINARY (C) | DELAYED 6 BIT BINARY (D) | OUTPUT (E) 7 BIT BINARY | OUTPUT (E) DECIMAL | DECIMAL INPUT (A) |
|---|---|---|---|---|---|---|---|---|
| | Odd Inputs: | | | | | | | |
| 1 | 15 | 0001111 | 0 | 000111 | 001000 | 0001111 | 15 | 15 |
| 2 | 15 | 0001111 | 1 | 001000 | 000111 | 0001111 | 15 | 15 |
| 3 | 15 | 0001111 | 0 | 000111 | 001000 | 0001111 | 15 | 15 |
| 4* | 25 | 0011001 | 1 | 001101 | 000111 | 0010100 | 20 | 25 |
| 5 | 15 | 0001111 | 0 | 000111 | 001101 | 0010100 | 20 | 15 |
| 6 | 15 | 0001111 | 1 | 001000 | 000111 | 0001111 | 15 | 15 |
| | Even Inputs: | | | | | | | |
| 7 | 20 | 0010100 | 0 | 001010 | 001010 | 0010100 | 20 | 20 |
| 8 | 20 | 0010100 | 1 | 001010 | 001010 | 0010100 | 20 | 20 |
| 9 | 20 | 0010100 | 0 | 001010 | 001010 | 0010100 | 20 | 20 |
| 10* | 10 | 0001010 | 1 | 000101 | 001010 | 0001111 | 15 | 10 |
| 11 | 20 | 0010100 | 0 | 001010 | 000101 | 0001111 | 15 | 20 |
| 12 | 20 | 0010100 | 1 | 001010 | 001010 | 0010100 | 20 | 20 |

*Impulse Signals

TABLE 3 shows the illustrative calculations for 12 input samples—the first 6 of which are odd and the next 6 samples are even. The 4th and the 10th samples represent a positive-going and a negative-going impulse respectively. The last 2 columns of TABLE 3 compare the output values of the Willis et al. dithering/dedithering arrangement, shown respectively in FIGS. 2 and 3, with the associated input values. As will be seen therefrom, this arrangement attenuates the impulse signals by a factor of 2 (i.e., 6 dB).

Figure 4:
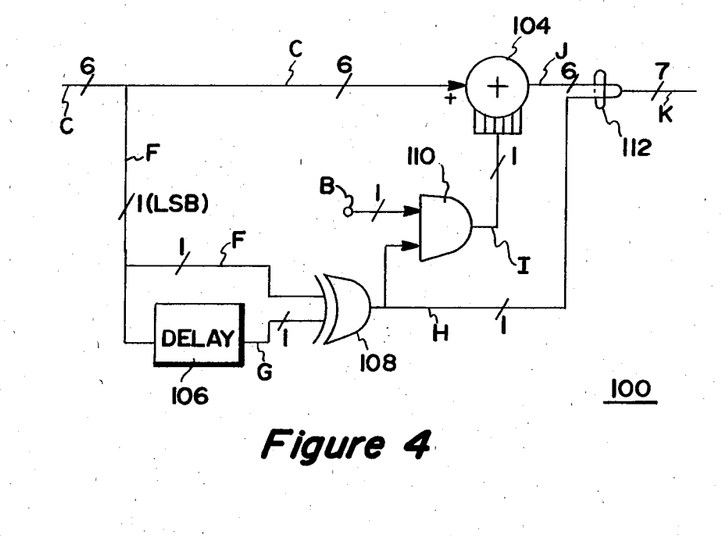
FIGS. 4 and 5 illustrate the alternative embodiments of a dedithering circuit in accordance with the present invention.
Figure 5:
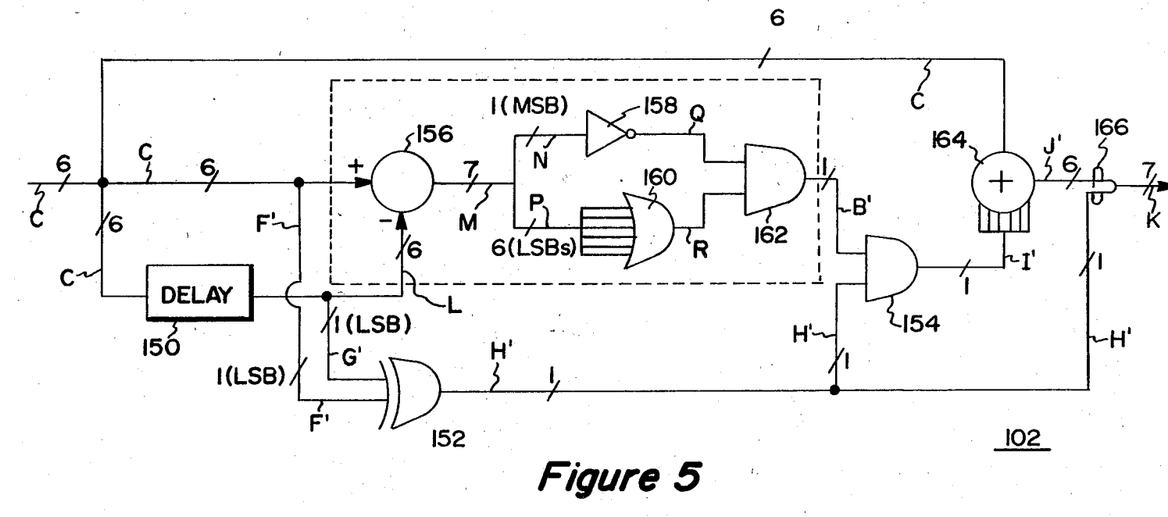

FIGS. 4 and 5 illustrate two embodiments 100 and 102 of the dedithering circuits, in accordance with the present invention, which may be substituted for the undither block 50 in FIG. 1. The purpose of the subject dedithering circuitry is to reconstruct both even and odd steady-state input signals without errors, and, furthermore, to minimize the reconstruction errors between the reconstituted signal and the original signal on transients. The FIG. 4 dedithering circuit 100 assumes that the dithering signal phase is known to the dedithering circuit. The FIG. 5 dedithering circuit 102, on the other hand, presumes that the dithering signal phase is not available to the dedithering circuit.

In the FIG. 4 dedithering circuit 100, the 6 bit dithered signal at the output of the FIG. 2 dithering circuit 30 is directly applied to an adder 104. For the purposes of explanation, it is assumed that the signals at the output of the chrominance processer 40 are the same as the signals at the output of the dithering circuit 30. The least significant bit (LSB) of the 6 bit dithered signal is fed to a delay stage 106, where the LSB is delayed by approximately one sampling cycle. The delayed and the undelayed versions of the LSB are applied to an EXCLUSIVE-OR element 108. The element 108 compares the previous LSB with the present LSB of the 6 bit dithered signal. If they are unequal (i.e., 0 and 1 or 1 and 0), the element 108 outputs a "1" on the line H. If the delayed and undelayed LSB's are equal (i.e., both zeros or both ones), then the element 108 outputs a "0" on the line H. The output of the element 108 also constitutes the least significant bit (i.e., 7$^{th}$ bit) of a 7 bit reconstructed signal as will be seen later.

The output of the EXCLUSIVE-OR element 108 is applied to an AND gate 110 along with the 1 bit dithering signal on the line B. The AND gate 110 produces at the output thereof a one when the dithering signal and the LSB of the reconstituted signal are both one. Otherwise, the AND gate 110 generates a zero at the output thereof on the line I.

If the output of the AND gate 110 is a one, then a 6 bit signal comprising all ones is produced and fed to the adder 104 to be added to the 6 bit dithered signal on the bus C. The all-one signal is actually a minus-one signal, which decrements the higher value of the alternating 6 bit dithered signal by one to generate the 6 MSB's of the 7 bit reconstituted signal.

If the output of the AND gate 110, is, on the other hand, a zero, then a 6 bit signal comprising all zeros is added to the 6 bit dithered signal in the adder 104. In effect, the 6 bit dithered signal passes unaltered to the output of the adder 104. In other words, the 6 MSB's of the 7 bit reconstituted signal are the same as the 6 bits of the 6 bit dithered signal.

The output of the adder 104 forms the 6 most significant bits (MSB's) of the 7 bit reconstituted signal. The 6 MSB's at the output of the adder 104 are merged with the LSB at the output of the EXCLUSIVE-OR gate 108 to reconstitute the original 7 bit signal.

The operation of the dedithering circuit 100 of the present invention is illustrated in TABLE 4. The output of the FIG. 2 dithering circuit 30, shown in the 5th column of TABLE 3, is applied directly to the dedithering circuit 100 shown in FIG. 4.

TABLE 4

| SAMPLE NUMBER | 6 BIT DITHERED BINARY (C) | UNDELAYED LSB (F) | DELAYED LSB (G) | LSB (H) | DITHERING SIGNAL (B) | SUB. OR NOT BIT (I) | 6 MSB's (J) | OUTPUT (K) 7 BIT BINARY | OUTPUT (K) DECIMAL | DECIMAL INPUT (A) |
|---|---|---|---|---|---|---|---|---|---|---|
| | Odd Inputs: | | | | | | | | | |
| 1 | 000111 | 1 | 0 | 1 | 0 | 0 | 000111 | 0001111 | 15 | 15 |
| 2 | 001000 | 0 | 1 | 1 | 1 | 1 | 000111 | 0001111 | 15 | 15 |
| 3 | 000111 | 1 | 0 | 1 | 0 | 0 | 000111 | 0001111 | 15 | 15 |
| 4* | 001101 | 1 | 1 | 0 | 1 | 0 | 001101 | 0011010 | 26 | 25 |
| 5 | 000111 | 1 | 1 | 0 | 0 | 0 | 000111 | 0001110 | 14 | 15 |
| 6 | 001000 | 0 | 1 | 1 | 1 | 1 | 000111 | 0001111 | 15 | 15 |

TABLE 4-continued

| SAMPLE NUMBER | 6 BIT DITHERED BINARY (C) | UNDELAYED LSB (F) | DELAYED LSB (G) | LSB (H) | DITHERING SIGNAL (B) | SUB. OR NOT BIT (I) | 6 MSB's (J) | OUTPUT (K) 7 BIT BINARY | DECIMAL | DECIMAL INPUT (A) |
|---|---|---|---|---|---|---|---|---|---|---|
| | Even Inputs: | | | | | | | | | |
| 7 | 001010 | 0 | 0 | 0 | 0 | 0 | 001010 | 0010100 | 20 | 20 |
| 8 | 001010 | 0 | 0 | 0 | 1 | 0 | 001010 | 0010100 | 20 | 20 |
| 9 | 001010 | 0 | 0 | 0 | 0 | 0 | 001010 | 0010100 | 20 | 20 |
| 10* | 000101 | 1 | 0 | 1 | 1 | 1 | 000100 | 0001001 | 9 | 10 |
| 11 | 001010 | 0 | 1 | 1 | 0 | 0 | 001010 | 0010101 | 21 | 20 |
| 12 | 001010 | 0 | 0 | 0 | 1 | 0 | 001010 | 0010100 | 20 | 20 |

*Impulse Signals

From the comparison of the last two columns in TABLE 4, it will be seen that the FIG. 4 dedithering circuit minimizes the errors between the reconstituted 7 bit signal and the original 7 bit signal, when transients are present. TABLE 5 provides a side-by-side comparison of the outputs of the dedithering circuits of FIGS. 3 and 4. It will be marked that the FIG. 4 dedithering circuit of the present invention represents substantial improvement over the FIG. 3 dedithering circuit of the prior art on transients.

TABLE 5

| SAMPLE NUMBER | SIGNAL INPUT(A) | FIG. 3 OUTPUT(E) | FIG. 4 OUTPUT(K) | FIG. 5 OUTPUT(K') |
|---|---|---|---|---|
| | Odd Inputs: | | | |
| 1 | 15 | 15 | 15 | 15 |
| 2 | 15 | 15 | 15 | 15 |
| 3 | 15 | 15 | 15 | 15 |
| 4* | 25 | 20 | 26 | 26 |
| 5 | 15 | 20 | 14 | 14 |
| 6 | 15 | 15 | 15 | 15 |
| | Even Inputs: | | | |
| 7 | 20 | 20 | 20 | 20 |
| 8 | 20 | 20 | 20 | 20 |
| 9 | 20 | 20 | 20 | 20 |
| 10* | 10 | 15 | 9 | 11 |
| 11 | 20 | 15 | 21 | 19 |
| 12 | 20 | 20 | 20 | 20 |

FIG. 5 shows another embodiment of the dedithering circuit according to the present invention. The FIG. 5 dedithering circuit 102 is suitable when the dithering phase is not known to the dedithering circuit. As previously noted, the dedithering circuit 102 of FIG. 5 can be substituted for the undither block 50 in FIG. 1.

Referring to FIG. 5, the 6 bit dithered signal, on the bus C, is such as that produced by the FIG. 2 dithering circuit 30, and is as set forth in the 5th column in TABLE 3. For the purposes of illustration, it is again assumed that the 6 bit dithered signal at the output of the dithering circuit 30 is applied directly to the dedithering circuit 102 of FIG. 5.

The 6 bit dithered signal is fed to a delay element 150, whereby the input signal is delayed by approximately one sampling cycle. The least significant bit of the undelayed 6 bit dithered signal on the line F' and the least significant bit of the delayed 6 bit dithered signal on the line G' are applied to an EXCLUSIVE-OR gate 152. The gate 152 compares the present and the previous LSB's of the 6 bit dithered signal. If the two LSB's are unequal, the gate 152 produces a "1" on the output line H'. Otherwise, it produces a "0" on the output line H'. The output of the gate 152 also constitutes the least significant bit (i.e., 7th bit) of the reconstructed 7 bit signal in the manner explained later.

The output of the EXCLUSIVE-OR gate 152 is further applied to an AND gate 154 along with a 1 bit signal on the line B', which simulates a 1 bit dithering signal. The AND gate 154 produces at the output thereof a one when the simulated dithering signal and the LSB of the reconstituted 7 bit signal are both one. On the other hand, the AND gate 154 generates a zero at the output thereof on the line I'. It is noted again that in the FIG. 5 dedithering circuit arrangement, the phase of the actual dithering signal is not known to the dedithering circuit.

To produce the simulated dithering signal B', the delayed 6 bit dithered signal is subtracted from the undelayed 6 bit dithered signal in a subtracter 156 to produce a 7 bit difference signal on the bus M. The most significant bit of the difference signal is applied to an inverter 158 to see if the difference signal is non-negative. The output of the inverter 158 is a one if the difference signal is non-negative. Otherwise, the inverter output is a zero.

The six least significant bits on the bus M are applied to an OR gate 160. The output of the OR gate 160 is a one if the difference signal is non-zero and non-negative. The outputs of the inverter 158 and the OR gate 160 are applied to an AND gate 162. The output of the AND gate 162 on the line B' is a one if the difference signal on the bus M is both non-negative and non-zero.

As previously indicated, the simulated dithering signal on the line B' is fed to the AND gate 154 along with least significant bit of the 7 bit reconstituted signal on the line H'. If the output of the AND gate 154 is a one, then a 6 bit signal comprising all ones is fed to the adder 164 to be added to the 6 bit dithered signal on the bus C. In effect, the 6 bit dithered signal is decremented by one to generate the 6 MSB's of the 7 bit reconstituted signal.

On the other hand, if the output of the AND gate 164 is a zero, the 6 bit dithered signal is passed unaltered to the output bus J' to again define the 6 MSB's of the 7 bit reconstituted signal.

The 6 bit output of the adder 164 is merged with the bit on the line H' to reconstitute the 7 bit original signal.

The operation of the dedithering circuit 102 of the subject invention is illustrated in TABLE 6 with the aid of several examples. The column headings in TABLE 6 represent the associated buses and lines in FIG. 5.

TABLE 6

| SAMPLE NUMBER | 6 BIT DITHERED BINARY (C) | DELAYED 6 BIT BINARY (L) | UNDELAYED LSB (F') | DELAYED LSB (G') | LSB (H') | 6 BIT DIFF. SIGNAL (M) | SIGN BIT (N) | REMAINING 5 BITS (P) |
|---|---|---|---|---|---|---|---|---|

TABLE 6-continued

|  |  |  |  |  |  |  |  |  |
|---|---|---|---|---|---|---|---|---|
|  | Odd Inputs: |  |  |  |  |  |  |  |
| 1 | 000111 | 001000 | 1 | 0 | 1 | 111111 | 1 | 11111 |
| 2 | 001000 | 000111 | 0 | 1 | 1 | 000001 | 0 | 00001 |
| 3 | 000111 | 001000 | 1 | 0 | 1 | 111111 | 1 | 11111 |
| 4* | 001101 | 000111 | 1 | 1 | 0 | 000110 | 0 | 00110 |
| 5 | 000111 | 001101 | 1 | 1 | 0 | 111010 | 1 | 11010 |
| 6 | 001000 | 000111 | 0 | 1 | 1 | 000001 | 0 | 00001 |
|  | Even Inputs: |  |  |  |  |  |  |  |
| 7 | 001010 | 001010 | 0 | 0 | 0 | 000000 | 0 | 00000 |
| 8 | 001010 | 001010 | 0 | 0 | 0 | 000000 | 0 | 00000 |
| 9 | 001010 | 001010 | 0 | 0 | 0 | 000000 | 0 | 00000 |
| 10* | 000101 | 001010 | 1 | 0 | 1 | 111011 | 1 | 11011 |
| 11 | 001010 | 000101 | 0 | 1 | 1 | 000101 | 0 | 00101 |
| 12 | 001010 | 001010 | 0 | 0 | 0 | 000000 | 0 | 00000 |

| SAMPLE NUMBER | NON-NEG BIT (Q) | NON-ZERO BIT (R) | SIMULATED DITHER (B') | SUB. OR NOT BIT (I') | 6 MSB's (J') | OUTPUT (K') 7 BIT BINARY | DECIMAL | DECIMAL INPUT (A) |
|---|---|---|---|---|---|---|---|---|
|  | Odd Inputs: |  |  |  |  |  |  |  |
| 1 | 0 | 0 | 0 | 0 | 000111 | 0001111 | 15 | 15 |
| 2 | 1 | 1 | 1 | 1 | 000111 | 0001111 | 15 | 15 |
| 3 | 0 | 0 | 0 | 0 | 000111 | 0001111 | 15 | 15 |
| 4* | 1 | 1. | 1 | 0 | 001101 | 0011010 | 26 | 25 |
| 5 | 0 | 1 | 0 | 0 | 000111 | 0001110 | 14 | 15 |
| 6 | 1 | 1 | 1 | 1 | 000111 | 0001111 | 15 | 15 |
|  | Even Inputs: |  |  |  |  |  |  |  |
| 7 | 1 | 0 | 0 | 0 | 001010 | 0010100 | 20 | 20 |
| 8 | 1 | 0 | 0 | 0 | 001010 | 0010100 | 20 | 20 |
| 9 | 1 | 0 | 0 | 0 | 001010 | 0010100 | 20 | 20 |
| 10* | 0 | 1 | 0 | 0 | 000101 | 0001011 | 11 | 10 |
| 11 | 1 | 1 | 1 | 1 | 001001 | 0010011 | 19 | 20 |
| 12 | 1 | 0 | 0 | 0 | 001010 | 0010100 | 20 | 20 |

*Impulse Signals

TABLE 5 provides a side-by-side comparison of the performances of the dedithering circuits of FIGS. 3, 4 and 5 respectively. It will be observed that the dedithering circuits of FIGS. 4 and 5, in accordance with the present invention, represent substantial improvement over the FIG. 3 dedithering circuit of the prior art vis-a-vis the transient response.

The digital signal processing apparatus described herein including the ADC 10, analog dither source 12, processors 20 and 40, and DAC 60 correspond, for example, to the digital signal processing integrated circuits for television receivers available from ITT Semiconductors, Intermetall, Freiburg, West Germany and described in an ITT Semiconductors brochure entitled VLSI Digital TV System DIGIT 2000, dated August 1982, which is incorporated herein by reference. The numbers of bits of the digital signals described herein correspond to those afore-mentioned integrated circuits.

As described above, the present invention tends to retain the information represented by one deleted bit so that exact replica of the original digital signal is possible, when the input signals are steady-state. This invention also minimizes errors between the reconstituted signal and the original signal, when transients are present.

A further application of dither/dedither circuits of the type described herein is the coupling of parallel bit signals between integrated circuits (IC's). For example, consider an integrated digital signal processing circuit, which cannot accommodate the required number of output connections because of the IC package limitations. Dither circuits incorporated on such an IC will reduce the number of output connections by reducing the bit width of signals to be coupled between the respective IC's. The signals may thereafter be reconstructed by a dedither circuit on the receiving IC.

What is claimed is:
1. Digital signal processing apparatus comprising:
  a source of a binary digital undithered signal; said undithered signal consisting of successive samples occurring at a certain rate and having n bits, where n is a positive integer;
  a source of a 1 bit binary digital dithering signal alternating, at one-half said certain rate, between zero and one for the successive samples of said undithered signal;
  dithering means for combining said n bit undithered samples with said 1 bit dithering samples to produce dithered digital signal samples having n-1 bits; said dithering means developing n-1 bit dithered samples which are alternating between (a) an n-1 bit lower value that corresponds to the n-1 most significant bits of said n bit undithered samples, and (b) an n-1 bit higher value that corresponds to the n-1 most significant bits of said n bit undithered samples plus one in response to steady-state n bit undithered samples when the least significant bit is one; on the other hand, said dithering means generating n-1 bit non-alternating samples which correspond to the n-1 most significant bits of said n bit undithered samples when the least significant bit of steady-state undithered samples is zero;
  processing means for digitally processing said n-1 bit dithered signal samples to develop n-1 bit processed digital signal samples at the output thereof;
  means for delaying the least significant bit of said n-1 bit processed samples by approximately one sampling cycle;
  means for detecting the equality and inequality of said undelayed least significant bit and said delayed least significant bit of said n-1 bit processed samples to generate at the output thereof a first set of 1 bit digital signal samples comprising a zero and a one respectively; said first set of 1 bit signal samples representing the least significant bit of an n bit reconstituted digital signal samples;

means for comparing said first set of 1 bit signal samples with said 1 bit dithering signal samples for producing at the output thereof a second set of 1 bit signal samples (a) having an instantaneous value of one if both said first 1 bit signal and said 1 bit dithering signal have an instantaneous value of one, and (b) having an instantaneous value of zero otherwise;

means for combining said n-1 bit processed signal samples with said second set of 1 bit signal samples to generate at the output thereof the n-1 most significant bits of said reconstituted signal samples; said combining means decrementing said n-1 bit processed samples by one when said second 1 bit signal has an instantaneous value of one; said combining means passing said n-1 bit processed samples without change when said second 1 bit signal has an instantaneous value of zero; and means for merging said n-1 most significant bits at said output of said combining means with said first set of 1 bit signal samples to generate said n-bit reconstituted signal samples.

2. The digital signal processing apparatus as defined in claim 1 wherein said source of said dithering signal samples comprises a flip-flop driven by the clock used for generating said successive samples of said undithered signal.

3. The digital signal processing apparatus as defined in claim 2 wherein said dithering means comprises (a) an n bit digital adder for adding said 1 bit dithering samples to said n bit undithered samples, and (b) truncating means for eliminating the least significant bit from the n bit output of said adder to develop said n-1 bit dithered signal samples at the output of said truncating means.

4. The digital signal processing apparatus as defined in claim 1 wherein said detecting means comprises an EXCLUSIVE-OR gate (a) having a first input coupled for receiving the least significant bit of said n-1 bit processed samples, (b) having a second input coupled for receiving the delayed least significant bit of said n-1 bit processed samples, and (c) having an output at which said first set of 1 bit samples are developed.

5. The digital signal processing apparatus as defined in claim 4 wherein said comparing means comprises an AND gate (a) having a first input coupled for receiving said dithering samples, (b) having a second input coupled for receiving said first set of 1 bit samples, and (c) having an output at which said second set of 1 bit samples are generated.

6. The digital signal processing apparatus as defined in claim 5 wherein said combining means comprises a subtracter for subtracting said second set of 1 bit samples from said n-1 bit processed samples.

7. The digital signal processing apparatus as defined in claim 5 wherein said combining means comprises a summing circuit for adding, to said n-1 bit processed samples, n-1 bit samples comprising all ones or all zeros, depending on whether the instantaneous value of said second 1 bit signal is one or zero, respectively.

8. Digital signal processing apparatus comprising:

a source of a binary digital undithered signal; said undithered signal consisting of successive samples occurring at a certain rate and having n bits, where n is a positive integer; the most significant bit of said n bit undithered signal representing the associated sign;

a source of a 1 bit binary digital dithering signal alternating, at one-half said certain rate, between zero and one for the successive samples of said undithered signal;

dithering means for combining said n bit undithered samples with said 1 bit dithering samples to produce dithered digital signal samples having n-1 bits; said dithering means developing n-1 bit dithered samples which are alternating between (a) an n-1 bit lower value that corresponds to the n-1 most significant bits of said n bit undithered samples, and (b) an n-1 bit higher value that corresponds to the n-1 most significant bits of said n bit undithered samples plus one thereof in response to steady-state n bit undithered samples when the least significant bit is one; on the other hand, said dithering means generating n-1 bit non-alternating samples which correspond to the n-1 most significant bits of said n bit undithered samples. When the least significant bit of steady-state undithered samples is zero;

processing means for digitally processing said n-1 bit dithered samples to develop n-1 bit processed digital signal samples at the output thereof;

means for delaying said n-1 bit processed samples by approximately one sampling cycle;

means for detecting the equality and inequality of the least significant bit of said n-1 bit undelayed processed samples and the least significant bit of said delayed n-1 bit processed samples to generate at the output thereof a first set of 1 bit digital signal samples comprising a zero and a one respectively; said first set of 1 bit signal samples representing the least significant bit of an n bit reconstituted digital signal;

means for comparing said n-1 bit undelayed and delayed processed samples to generate at the output thereof a second set of 1 bit signal samples (a) having an instantaneous value of one when said undelayed samples are larger than said delayed samples, and (b) having an instantaneous value of zero otherwise;

means for comparing said first set of 1 bit signal samples with said second set of 1 bit signal samples for producing at the output thereof a third set of 1 bit signal samples (a) having an instantaneous value of one if both said first and second set of 1 bit signals have an instantaneous value of one, and (b) having an instantaneous value of zero otherwise;

means for combining said n-1 bit processed signal samples with said third set of 1 bit signal samples to generate at the output thereof the n-1 most significant bits of said reconstituted signal samples; said combining means decrementing said n-1 bit processed samples by one when said third set of 1 bit signal samples have an instantaneous value of one; said combining means passing said n-1 bit processed samples without alteration when said third set of 1 bit signal samples have an instantaneous value of zero; and means for merging the n-1 most significant bits at said output of said combining means with said first set of 1 bit signal samples to generate said n-bit reconstituted signal samples.

9. The digital signal processing apparatus as defined in claim 8 wherein said first-mentioned comparing means comprises:

means for subtracting said delayed n-1 bit processed samples from said undelayed n-1 bit processed samples to produce at the output thereof a further set of n bit signal samples;

means, coupled to said subtracting means, for developing at the output thereof said second set of 1 bit signal samples (a) having an instantaneous value of one when the instantaneous value of said further n bit signal is non-negative and non zero, and (b) having an instantaneous value of zero otherwise.

10. The digital signal processing apparatus as defined in claim 9 wherein said developing means comprises:

an inverter (a) having an input coupled for receiving the most significant bit of said further set of n bit signal samples, and (b) having an output at which inverted values of the associated input values are generated;

an OR gate (a) having respective inputs coupled to the n-1 least significant bits of said further set of n bit signal samples, and (b) having an output which assumes an instantaneous value of one when said further set of n bit signal samples are non-zero and non-negative and assumes an instantaneous value of zero otherwise; and an AND gate (a) having a first input coupled to said output of said inverter, (b) having a second input coupled to said output of said OR gate, and (c) having an output at which said second set of 1 bit signal samples are produced for application to said second-mentioned comparing means.

11. In a digital signal processing apparatus including a source of a binary digital undithered signal; said undithered signal consisting of successive samples occurring at a certain rate and having n bits, where n is a positive integer; a source of one bit digital dithering signal, alternating, at one-half said certain rate, between zero and one for the successive samples of said undithered signal; dithering means, coupled to said sources of undithered and dithering signals, for producing n-1 bit dithered digital signal samples; undithering means for generating an n bit reconstituted digital signal comprising:

means for delaying the least significant bit of said n-1 bit dithered samples by approximately one sampling cycle;

means for detecting the equality and inequality of said undelayed least significant bit and said delayed least significant bit of said n-1 bit dithered samples to generate at the output thereof a first set of 1 bit digital signal samples comprising a zero and a one respectively; said first set of 1 bit signal samples representing the least significant bit of said n bit reconstituted digital signal samples;

means for comparing said first set of 1 bit signal samples with said 1 bit dithering signal samples for producing at the output thereof a second set of 1 bit signal samples (a) having an instantaneous value of one if both said first 1 bit signal and said dithering signal have an instantaneous value of one, and (b) having an instantaneous value of zero otherwise;

means for combining said n-1 bit dithered signal samples with said second set of 1 bit signal samples to generate at the output thereof the n-1 most significant bits of said reconstituted signal samples; said combining means decrementing said n-1 bit dithered samples by one when said second 1 bit signal has an instantaneous value of one; said combining means passing said n-1 bit dithered samples without change when said second 1 bit signal has an instantaneous value of zero; and means for merging said n-1 most significant bits at said output of said combining means with said first set of 1 bit signal samples to generate said n-bit reconstituted signal samples.

12. In a digital signal processing apparatus including a source of a binary digital undithered signal; said undithered signal consisting of successive samples occurring at a certain rate and having n bits, where n is a positive integer; dithering means, coupled to said source of undithered signal, for producing n-1 bit dithered digital signal samples; undithering means for generating an n bit reconstituted digital signal comprising:

means for delaying said n-1 bit dithered samples by approximately one sampling cycle;

first means for detecting the equality and inequality of the least significant bit of said n-1 bit undelayed dithered samples and the least significant bit of said n-1 bit delayed dithered samples to generate at the output thereof a first set of 1 bit digital signal samples comprising a zero and a one respectively; said first set of 1 bit signal samples representing the least significant bit of said n bit reconstituted digital signal samples;

means for comparing said n-1 bit undelayed and delayed dithered samples to generate at the output thereof a second set of 1 bit signal samples (a) having an instantaneous value of one when said undelayed samples are larger than said delayed samples, and (b) having an instantaneous value of zero otherwise;

means for comparing said first set of 1 bit signal samples with said second set of 1 bit signal samples for producing at the output thereof a third set of 1 bit signal samples (a) having an instantaneous value of one if both said first and second set of 1 bit signals have an instantaneous value of one, and (b) having an instantaneous value of zero otherwise;

means for combining said n-1 bit dithered signal samples with said third set of 1 bit signal samples to generate at the output thereof the n-1 most significant bits of said reconstituted signal samples; said combining means decrementing said n-1 bit dithered samples by one when said third set of 1 bit signal samples have an instantaneous value of one; said combining means passing said n-1 bit dithered samples without alteration when said third set of 1 bit signal samples have an instantaneous value of zero; and means for merging the n-1 most significant bits at said output of said combining means with said first of 1 bit signal samples to generate said n-bit reconstituted signal samples.

13. In a digital signal processing system including a source of digital signal samples which were reduced in sample bit size by adding a dither signal to the signal samples and truncating the least significant bit of the sample sums, apparatus for dedithering signal samples comprising:

means responsive to dithered signal samples for comparing the least significant bits of successive dithered signal samples, said means producing a bilevel signal having a first state when the least significant bits of successive samples have like values and a second state when the least significant bits have differing values;

means responsive to said dither signal, said bilevel signal and said dithered signal samples for decrementing said dithered signal samples by a unit value when the dither signal is a logical 1 and the value of the least significant bits of current dithered signal sample and the preceding dithered signal sample differ; and means for concatenating the bilevel signal, as the least significant bit, to samples produced by said means for decrementing said dithered signal, which concatenated samples correspond to dedithered signal.

14. In a digital signal processing system including a source of digital signal samples which were reduced in sample bit size by adding a dither signal to the signal samples and truncating the least significant bit of the sample sums, apparatus for dedithering signal samples comprising:

first means responsive to dithered signal samples for comparing the least significant bits of successive dithered signal samples, said means producing a bilevel signal having a first state when the least significant bits of successive samples have like values and a second state when the least significant bits have differing values;

second means responsive to dithered signal samples including means for comparing successive dithered signal samples and producing a simulated dither signal having a first state when the current dithered signal sample is greater than the preceding dithered signal sample, and having a second state otherwise;

means responsive to said simulated dither signal, said bilevel signal and said dithered signal samples for decrementing said dithered signal samples by a unit value when the simulated dither signal is in its first state and the value of the least significant bits of current dithered signal sample and the preceding dithered signal sample differ; and means for concatenating the bilevel signal, as the least significant bit, to samples produced by said means for decrementing said dithered signal, which concatenated samples correspond to dedithered signal.

* * * * *